(12) United States Patent
Lange et al.

(10) Patent No.: US 6,362,261 B1
(45) Date of Patent: Mar. 26, 2002

(54) METHODS OF PREPARING CATIONIC LAYER COMPOUNDS, CATIONIC LAYER COMPOUNDS PREPARED THEREBY, AND METHODS OF USE THEREFOR

(75) Inventors: Ilona Lange, Langenfeld; Joerg-Dieter Klamann, Bremerhaven; Peter Daute, Beverstedt; Juergen Foell, Duesseldorf; Peter Wedl, Bremerhaven; Stefan Kuepper, Hilden, all of (DE)

(73) Assignee: Cognis Deutschland GmbH, Duesseldorf (DE)

( * ) Notice: Subject to any disclaimer, the term of this patent is extended or adjusted under 35 U.S.C. 154(b) by 0 days.

(21) Appl. No.: 09/555,752
(22) PCT Filed: Nov. 25, 1998
(86) PCT No.: PCT/EP98/07612
§ 371 Date: Oct. 2, 2000
§ 102(e) Date: Oct. 2, 2000
(87) PCT Pub. No.: WO99/29622
PCT Pub. Date: Jun. 17, 1999

(51) Int. Cl.⁷ .............................. C08K 3/00; C01F 7/00
(52) U.S. Cl. ................... 524/153; 423/420.2; 423/430; 423/432; 524/387; 524/390; 524/425; 524/436
(58) Field of Search .................. 524/387, 390, 524/424, 425, 436, 153; 423/432, 430, 420.2

(56) References Cited

U.S. PATENT DOCUMENTS

| | | | |
|---|---|---|---|
| 4,299,759 A | 11/1981 | Miiyata et al. | |
| 4,447,417 A | 5/1984 | Spickett et al. | |
| 4,539,195 A | 9/1985 | Schanz et al. | |
| 4,560,545 A | 12/1985 | Spickett et al. | |
| 4,642,193 A | * 2/1987 | Miyata et al. | 210/682 |
| 4,656,156 A | 4/1987 | Misra | |
| 5,073,584 A | 12/1991 | Meszaros et al. | |
| 5,250,279 A | 10/1993 | Preston et al. | |
| 5,416,135 A | 5/1995 | Endres et al. | |
| 5,416,141 A | 5/1995 | Endres et al. | |
| 5,507,980 A | * 4/1996 | Kelkar et al. | 502/414 |
| 6,166,124 A | * 12/2000 | Lange et al. | 524/451 |
| 6,261,530 B1 | * 7/2001 | Bruer et al. | 423/430 |

FOREIGN PATENT DOCUMENTS

| | | |
|---|---|---|
| CA | 932121 | 8/1973 |
| DE | 2 061 114 A | 7/1971 |
| DE | 1 592 126 | 6/1977 |
| DE | 29 05 256 A | 8/1979 |
| DE | 30 19 632 C | 2/1984 |
| DE | 33 06 822 C2 | 8/1984 |
| DE | 44 25 266 C1 | 10/1995 |
| DE | 44 25 275 A1 | 1/1996 |
| DE | 195 11 016 A1 | 9/1996 |
| DE | 196 17 138 A1 | 11/1997 |
| EP | 0 377 428 B1 | 7/1990 |
| EP | 0 189 899 B2 | 8/1996 |
| WO | WO92/06135 A | 4/1992 |
| WO | WO92/20619 A1 | 11/1992 |
| WO | WO92/20732 A1 | 11/1992 |

OTHER PUBLICATIONS

W.T. Reichle, Chemtec, (Jan., 1986), pp. 58–63.
Dr. Otto–Albrecht Neumüller, RÖMPPS Chemie–Lexikon, 1973, p. 1539.
Kirk–Othmer, "Encyclopedia of Chemical Technology", vol. 7, 3th Ed., (1979), pp. 840–841.
Ullmann's Encyclopedia of Industrial Chemistry, vol. A8, 5th Ed., (1987), pp. 586–601.
Ullmann's Encyclopedia of Industrial Chemistry, vol. 19, 4th Ed., (1980), pp. 2–11.
Ullmann's Encyclopedia of Industrial Chemistry, vol. 16, 4th Ed., (1978), pp. 254–257.

* cited by examiner

*Primary Examiner*—Veronica P. Hoke
(74) *Attorney, Agent, or Firm*—John E. Drach; Aaron R. Ettelman

(57) ABSTRACT

A method of preparing a modified cationic layer compound which includes providing a layer compound of the general formula (I):

$$[E_e Z_z D_d V_v(OH^-)_x](A^{n-})_a \cdot qH_2O \qquad (I)$$

wherein E represents one or more monovalent alkali metal cations, e represents a number of from 0 to about 2, Z represents one or more divalent metal cations, z represents a number of from 0 to about 6, D represents one or more trivalent metal cations, d represents a number of from 0 to about 3, V represents one or more tetravalent metal cations, v represents a number of from 0 to about 1, ($A^{n-}$) represents an acid anion wherein n represents an integer of from 1 to 3, q represents a number of from about 1 to about 10, and wherein x>a and e+2z+3d+4v=x+na; subjecting the layer compound to crystallization to provide a resultant material; and subjecting the resultant material to steam drying at a temperature of from about 200° C. to about 260° C. for a period of time of from about 3 to about 6 hours, said steam drying comprising passing a source of steam continuously over the resultant material at a rate of from about 0.001 to about 10 moles of water per hour, per kilogram of the resultant material; is described. Cationic layer compounds made by the disclosed process, and uses therefor, are also described.

20 Claims, No Drawings

METHODS OF PREPARING CATIONIC LAYER COMPOUNDS, CATIONIC LAYER COMPOUNDS PREPARED THEREBY, AND METHODS OF USE THEREFOR

BACKGROUND OF THE INVENTION

Halogenated plastics or molding compounds produced therefrom are known to have a tendency toward degradation or decomposition reactions if they are exposed to thermal stress or come into contact with high energy radiation, for example ultraviolet light. To counteract this there are customarily incorporated into them heavy metal compounds based, for example, on lead, barium and/or cadmium. However, from the viewpoint of occupational health, there is a requirement to replace these absolutely effective stabilizers with substances which are less hazardous to health. As alternatives to the heavy metal compounds, for example calcium soaps and zinc soaps may be considered as stabilizers, but these do not achieve the efficiency of said heavy metal compounds, so that to increase their stabilizing action costabilizers are required.

German Patent DE-C-30 19 632 (Kyowa Chemical Ind.) describes the use of hydrotalcites to inhibit the thermal or UV-induced degradation of halogenated thermoplastic resins. In this patent, results of studies are reported which indicate that if hydrotalcites which are readily available on the market are incorporated, for example, into vinyl chloride resins, these hydrotalcites accelerate the dechlorination of the resins on heating or even cause a decomposition, black coloration or foam formation of the resins. In addition, it has been found that these hydrotalcites have poor dispersibility in the resins and adversely affect the rheological properties of the resins during the deformation and the appearance of the finished molded bodies. These research results are due to the small crystal size of the customary hydrotalcites and also to the high specific BET surface area of at least about 50 m$^2$/g and the water coating of the hydrotalcite particles. Accordingly, it is proposed in German Patent DE-C-30 19 632 to use hydrotalcites having a large crystal size and having a specific BET surface area of no more than 30 m$^2$/g. If desired, the hydrotalcites can be coated with an anionic surface-active compound such as sodium stearate.

European Patent Application EP-A-189 899 (Kyowa Chemical Ind.) also describes resin compositions which comprise hydrotalcites having specific BET surface areas less than 30 m$^2$/g. This European patent application discloses that the hydrotalcites can be modified with esters of higher fatty acids, anionic surface-active compounds and coupling agents of the silane or titanium types in order to improve the compatibility of the hydrotalcite with the plastic compounds. The hydrotalcites are to be modified in accordance with EP-A-189 899 by mechanical mixing of hydrotalcites with the modifying agents in pure or dissolved form.

According to DE-C-33 06 822 (Giulini Chemie), hydrotalcites of the formula [Mg$_6$Al$_2$(OH)$_{12}$](CO$_3$)$_2$.xH$_2$—where x≧2—are obtained by reacting aluminum hydroxide with magnesium hydroxide or magnesium oxide in the presence of basic magnesium carbonate as carbonate ion donor at a temperature of from 50° C. to 100° C. and subsequent spray-drying from the suspension. Aluminum hydroxide is used in particular in the form of "active" aluminum hydroxide.

U.S. Pat. No. 4,656,156 (Aluminum Company of America) describes a method of producing hydrotalcite, with the aluminum component used being the aluminate liquor of the Bayer process. The Bayer liquor is reacted with "active" magnesium oxide, as can be obtained, for example, by calcining magnesium carbonate. Use of this method is only economically expedient at those points where the Bayer liquor itself is produced, since otherwise in this case relatively large amounts of water would also have to be transported.

DE-A-15 92 126 (Kyowa Chemical Ind.) describes the production of hydrotalcites from various starting materials, for example from a suspension of solid aluminum hydroxide, solid magnesium hydroxide and sodium hydrogen carbonate. The reactions are carried out batchwise here and the products are separated off from the water phase by filtration or centrifugation and washed before they are dried.

According to DE-C-44 25 266 (Metallgesellschaft AG), the outlines of the topic of stabilizing halogenated plastics which is known to those skilled in the art are as follows: halogenated thermoplastic resins such as polyvinyl chloride (PVC) are converted during processing—in the course of melt forming—into polyene structures, hydrogen chloride (HCl) being eliminated. The polymer becomes discolored. To improve the thermal stability it is customary to incorporate metal carboxylates ("metal soaps") as stabilizers into the resin. However, since the incorporation of substances of this type as sole stabilizers can lead in the case of relatively long-duration melt forming to so-called metal burning, which causes black discoloration of the polymer, it is general practice to add a costabilizer. Customary costabilizers are, for instance, polyols, organic phosphorous esters or epoxy compounds. According to the teaching of DE-C-44 25 266, specific lithium-containing layer lattice compounds may be used to stabilize, in particular, PVC. The use of similar Li-containing layer lattice compounds to stabilize halogenated plastics is also taught, furthermore, by DE-A-44 25 275 (Metallgesellschaft AG).

DE-A-196 17 138 (Henkel KGaA) discloses a method for producing cationic layer compounds and the use of these compounds as stabilizers for halogenated plastics. The compounds are produced by subjecting layer compounds of specific structure to an alkali-induced aging in an aqueous environment, the alkali metal hydroxide content of the aqueous medium being set in the range from 1 to 6 molar, the aging temperature in the range from 60 to 100° C. and the aging time in the range from 2.5 to 50 hours. Special retreatment methods for further improving the stabilizing action with respect to halogenated plastics are, however, neither disclosed nor suggested in DE-A-196 17 138.

BRIEF SUMMARY OF THE INVENTION

The present invention includes methods of preparing cationic layer compounds, and more particularly, methods wherein a modified cationic layer compound, according to general formula (I) disclosed herein, is first subjected to a crystallization step, and then, a retreatment step. The retreatment in accordance with the present invention comprises steam drying. The present invention also includes modified cationic layer compounds prepared according to such methods, and methods of stabilizing halogenated plastics therewith.

The object of the present invention was to provide stabilizers for halogenated plastics. These stabilizers should be distinguished by an improved activity profile compared with the known prior art. In particular, halogenated plastics with these stabilizers incorporated therein should have improved values in the range of the initial color under thermal stress. The stabilizers, in addition, should have the following properties: good compatibility with calcium compounds and/or zinc compounds; dispersibility in halogenated plastics without impairing their rheological properties; high ability to trap well the decomposition products of halogenated plastics; this means in particular improved properties with respect to the ability to absorb hydrogen chloride; good long-term stability of halogenated plastics, in particular PVC (polyvinyl chloride), with the stabilizers incorporated therein.

The present invention firstly relates to a method for producing cationic layer compounds, in which layer compounds of the general formula (I)

$$[E_e Z_z D_d V_v (OH^-)_x][(A^{n-})_a \cdot qH_2O] \quad (I)$$

where:
E is a monovalent cation selected from the group consisting of the alkali metals,
e is a number in the range from 0 to 2,
Z is a divalent metal cation,
z is a number in the range from 0 to 6,
D is a trivalent metal cation,
d is a number in the range from 0 to 3,
V is a tetravalent metal cation,
v is a number in the range from 0 to 1,
($A^{n-}$) is an acid anion of charge n–, where n is an integer from 1 to 3, and
q is a number in the range from 1 to 10,
with the proviso that x>a and e+2z+3d+4v=x+na,
(i) are firstly subjected to a crystallization and the resultant material
(ii) is then retreated,
which comprises, for the retreatment, carrying out a steam drying at temperatures in the range from 200 to 260° C. and the duration of the retreatment being in the range from 3 to 6 hours, with the proviso that steam, which is applied either directly or in the form of a steam-containing inert carrier gas, is passed continuously over the material to be dried at a rate which is in the range from 0.001 to 10 mol of water per hour and kilogram of the crystalline layer lattice compound obtained in stage (i).

An inert carrier gas is taken to mean a gas or gas mixture which, under the retreatment conditions—that is to say temperatures in the range from 200 to 260° C. and a retreatment time of from 3 to 6 hours—does not react with the layer lattice compounds used. The nature of the carrier gas is subject to no such restrictions. In practice, in particular air or nitrogen are suitable.

In an embodiment of the present invention, the steam drying is subject to the proviso that steam, which is applied either directly or in the form of a steam-containing inert carrier gas, is fed at a rate which is in the range from 0.1 to 5 mol of water per hour and kilogram of the crystalline layer lattice compound obtained in stage (i).

In a preferred embodiment, for the retreatment, a steam-containing inert carrier gas is applied, with the proviso that the rate of the steam present in the carrier gas is set in the range from 0.5 to 1.5 mol of water per hour and kilogram of the crystalline layer lattice compound obtained in stage (i) and the rate of the steam-containing carrier gas is set to a value in the range from 500 to 1500 liters—the volumes are based on a temperature of 20° C. and a pressure of 1 bar—per hour and kilogram of the crystalline layer lattice compound obtained in stage (i).

This procedure may be carried out, for example, by passing an air stream at standard temperature—which is taken to mean here temperatures in the range from 0 to 50° C.—through a storage vessel containing water in order to enrich the air stream with water vapor in this manner. The water-vapor-containing air produced in this manner is then passed continuously over the material to be dried, that is to say the crystalline layer lattice compound obtained in stage (i).

Generally, it is of particular advantage if the material to be dried is spread out in as large an area as possible in a flat layer—for example in dishes or baths—in order to ensure an intimate contact with the steam or the steam-containing carrier gas. The material to be dried can, if desired, be agitated in a mixing manner in the course of this.

A particular advantage of the method of the invention is that it is carried out at atmospheric pressure in open systems. This is particularly economic, especially from engineering aspects.

In a further embodiment, the crystallization stage (i) is carried out in such a manner that the layer compounds (I) are subjected in an aqueous environment to an alkali-induced aging, the alkali metal hydroxide content of the aqueous medium being set in the range from 1 to 6 molar, the crystallization temperature in the range from 60 to 100° C. and the crystallization time in the range from 2.5 to 50 hours. For details of the crystallization step specified here, reference is made to DE-A-196 17 138 of the applicant. At this point, reference may be made only to the essential parameters:

The aging medium of the crystallization stage (i) is a from 1 to 6 molar aqueous alkali metal hydroxide solution. However, preferably, from 3 to 5 molar solutions are employed. The type of alkali metal hydroxide which is used to provide the aqueous-alkaline environment is not critical per se. Generally, however, sodium hydroxide is used.

The following applies with respect to the temperature of the crystallization stage (i): A temperature in the range from 60 to 100° C. is set. Preference is given here to a range from 70 to 90° C.

With respect to the time required for the crystallization stage (i), the following applies: In principle, a range from 2.5 to 50 hours is employed. If the time falls below the specified lower limit, the sought-after improvement in the properties of the layer compounds is not ensured. If the specified upper limit is exceeded, further improvement in the properties occurs only to a very restricted extent and it is therefore uneconomic. Preferably, crystallization times in the range of from 5 to 15 hours are employed.

In one embodiment, to carry out the method of the invention, layer compounds of the general formula (I) are used in which v is zero. These layer compounds may therefore be described by the general formula (I*):

$$[E_e Z_z D_d (OH^-)_x][(A^{n-})_a \cdot qH_2O] \quad (I^*)$$

where:
E is a monovalent cation selected from the group consisting of the alkali metals,
e is a number in the range from 0 to 2,
Z is a divalent metal cation,
z is a number in the range from 0 to 6,
D is a trivalent metal cation,
d is a number in the range from 0 to 3,
($A^{n-}$) is an acid anion of the charge n–, where n is an integer from 1 to 3, and
q is a number in the range from 1 to 10,
with the proviso that x>a and e+2z+3d=x+na.

In a further embodiment, to carry out the process of the invention, layer compounds of the general formula (I) are used in which e is zero. These layer compounds may therefore be described by the general formula (I**):

$$[Z_zD_dV_v(OH^-)_x](A^{n-})_a \cdot qH_2O \qquad (I^{**})$$

where:

Z is a divalent metal cation, z is a number in the range from 0 to 6,

D is a trivalent metal cation, d is a number in the range from 0 to 3,

V is a tetravalent metal cation, v is a number in the range from 0 to 1, ($A^{n-}$) is an acid anion of charge n–, where n is an integer from 1 to 3, and q is a number in the range from 1 to 10, with the proviso that x>a and 2z+3d+4v=x+na.

In a preferred embodiment, to carry out the process of the invention layer compounds of the general formula (I) are used in which e and v are each zero. These layer compounds may therefore be described by the general formula (I***):

$$[Z_zD_d(OH^-)_x](A^{n-})_a \cdot qH_2O \qquad (I^{***})$$

where:

Z is a divalent metal cation, z is a number in the range from 0 to 6,

D is a trivalent metal cation, d is a number in the range from 0 to 3, ($A^{n-}$) is an acid anion of charge n–, where n is an integer from 1 to 3, and q is a number in the range from 1 to 10, with the proviso that x>a and 2z+3d=x+na.

The layer compounds according to formula (I*) are the "classic" hydrotalcites which have long been known to those skilled in the art. Of these compounds, in turn, preference to given to those in which D is aluminum, d is the number 1 and z is a number in the range from 1 to 5. These specific hydrotalcites are characterized by the general formula (I**):

$$[Z_zAl(OH^-)_x](A^{n-})_a \cdot qH_2O \qquad (I^{****})$$

where:

Z is a divalent metal cation, z is a number in the range from 1 to 5, ($A^{n-}$) is an acid anion of charge n–, where n is an integer from 1 to 3, and q is a number in the range from 1 to 10, with the proviso that x>a and 2z+3=x+na.

The essence of the present invention is that the lattice structure of any cationic layer compounds (I)—in particular classic hydrotalcites of the general formula (I*) and (I**)—experiences, in the course of the retreatment, a modification in a manner such that—due to the extent of crystallinity which is optimized as a result—the effect of the resultant layer compounds as co-stabilizer for halogenated plastics is permanently improved. It is not critical here which origin the layer compound (I) used has. It can either be of natural origin or can be synthesized.

The change in crystallinity of the cationic layer compounds can be detected by X-ray structural analysis. It is proved here that synthetically produced layer compounds (I) which are used as starting material in the process according to the invention have relatively broad reflections in the X-ray structure diagram. After carrying out the first partial step of the process according to the invention, that is to say the crystallization stage (i), the reflections are sharp and narrow, which indicates high crystallinity. After carrying out the second partial stage of the process according to the invention, that is to say the retreatment stage (ii), the reflections are again slightly broadened, from which a slightly decreased crystallinity in comparison with the layer lattice compound obtained in stage (i) may be concluded. As the performance tests indicate, when the compounds prepared according to the invention are used in halogenated plastics, an improved stabilizing action against thermal or photochemical degradation results.

DETAILED DESCRIPTION OF THE INVENTION

The cationic layer compounds (I) are compounds which are known per se whose structure and production have been described, for example, by W. T. Reichle in Chemtec (January 1986), pages 58–63.

The prototype of cationic layer compounds is the mineral hydrotalcite [$Mg_6Al_2(OH)_{16}$]($CO_3$).$4H_2O$. Hydrotalcite is derived structurally from brucite [$Mg(OH)_2$]. Brucite crystallizes in a layer structure containing the metal ions in octahedral interstices between two layers of hexagonally tightly packed (OH$^-$) ions. Only every second layer of octahedral interstices is occupied by metal ions M, so that layer packages (OH)—M—(OH) are formed. The intermediate layers are empty in brucite; in hydrotalcite, some—roughly every second to fifth—of the Mg(II) ions are replaced at random by Al(III) ions. The layer package as a result becomes positively charged overall. This charge is balanced by anions which are situated in the intermediate layers together with readily removable water of crystallization. Diagram 1 shows—schematically—the layer structure of hydrotalcite.

Hydrotalcites form pulverulent masses with a talc-like feel having BET surface areas of up to about 150 m$^2$/g. Two basic syntheses are disclosed in the literature: one possible synthesis is to treat aqueous solutions of the corresponding metal salts with alkali metal hydroxide solution, the resulting hydrotalcite precipitating out. Another method starts from water-insoluble initial compounds such as metal oxides and metal hydroxides. These syntheses are heterogeneous reactions which are customarily carried out in the autoclave.

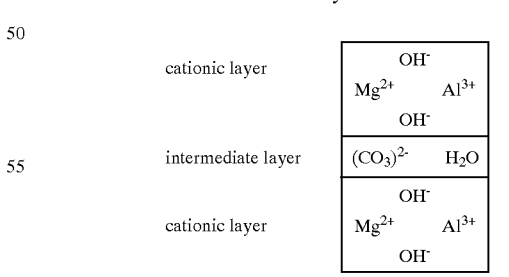

Diagram 1

Structure of Hydrotalcite

As mentioned above, hydrotalcite is merely the prototype of catonic layer compounds. However, the synthetic methods known from hydrotalcite are also used as a basis in general for synthesizing any cationic layer compounds. As known to those skilled in the art, these synthetic methods may be classified quite in general as hydrothermal synthesis. Hydrothermal synthesis in the narrower sense is taken to mean the synthesis of minerals from aqueous suspensions which have been heated to high temperatures—above a temperature of 100° C. and a pressure of 1 atm; hydrothermal syntheses are generally carried out in pressure vessels, since the temperatures employed are far above the boiling temperature of water, generally even above its critical temperature (cf. Römpps Chemie-Lexikon [Römpps's Chemistry Lexicon], $^7$1973, p. 1539).

For the purposes of the invention, the cationic layer compounds (I) are preferred where Z is at least one divalent metal ion selected from the group consisting of magnesium, calcium and zinc. Preferably, Z is precisely one divalent metal ion from said group and in particular magnesium. Cationic layer compounds of the general formula I are very particularly preferred, where $A^{n-}$ is an acid anion having the charge (n−) selected from the anion group consisting of carbonate, hydrogencarbonate, perchlorate, acetate, nitrate, tartrate, oxalate and iodide, preferably carbonate. If in the commentary on the above formula I mention is made of at least one divalent metal ion, this means that in the cationic layer compound different divalent metal ions can be present adjacently. The indices x, y and z, and also m, can be integers or nonintegral numbers within the specified conditions. Particularly advantageously, in cationic layer compounds of the general formula I, Z is magnesium and $A^{n-}$ is carbonate.

The BET surface area of the cationic layer compounds (I) to be used according to the invention is not critical per se. However, preferably, layer compounds (I) are used whose BET surface area is greater than 50 m$^2$/g. In a preferred embodiment of the present invention, layer compounds (I) are used which have a mean particle size in the range from 20 to 50 μm.

Examples of suitable cationic layer compounds are synthetic hydrotalcites which are also called basic aluminum magnesium carbonates and which can be produced in general by the method described in German Published Application DE-B-15 92 126 and in the German Laid-Open Applications DE-A-20 61 114 or DE-A-29 05 256.

Suitable sources of divalent metal ions are their carbonates, carbonate hydroxides, hydroxides, oxides or their water-soluble salts, for example the nitrates, chlorides, sulfates or perchlorates. Particularly preferably, sources of divalent metal ions are selected that already contain the $A^{n-}$ anion. In this case, it is not necessary to add an additional source of these anions. For example, it is particularly preferred to use at least a part of the divalent metal ions as carbonates or as carbonate hydroxides. If the sole source of divalent metal ions used is their oxides or hydroxides, it is necessary to add an additional source of the anions $A^{n-}$, for example in the form of alkali metal salts. Alkali metal salts of carbonic acid and/or of oxo acids of halogens, for example perchloric acid, are preferred, which can be added in amounts of from 1 to 100 mol % based on the aluminum content of the reaction mixture. For example, sodium carbonate can be added to the reaction batch.

The source of aluminum used can be not only finely particulate, active aluminum(III) hydroxide combined with sodium hydroxide, but also NaAlO$_2$. In addition aluminum chloride, aluminum bromide, aluminum nitrate and aluminum sulfate.

The present invention also relates to cationic layer compounds which are obtainable by firstly subjecting layer compounds of the general formula (I)

$$[E_eZ_zD_dV_v(OH^-)_x](A^{n-})_a \cdot qH_2O \qquad (I)$$

where:
E is a monovalent cation selected from the group consisting of the alkali metals,
e is a number in the range from 0 to 2,
Z is a divalent metal cation,
z is a number in the range from 0 to 6,
D is a trivalent metal cation,
d is a number in the range from 0 to 3,
V is a tetravalent metal cation,
v is a number in the range from 0 to 1,
($A^{n-}$) is an acid anion of charge n−, where n is an integer from 1 to 3, and
q is a number in the range from 1 to 10,
with the proviso that x>a and e+2z+3d+4v=x+na,
(i) to a crystallization and
(ii) then retreating the resultant material,
which comprises, for the retreatment, carrying out a steam drying at temperatures in the range from 200 to 260° C. and the duration of the retreatment being in the range from 3 to 6 hours, with the proviso that steam, which is applied either directly or in the form of a steam-containing inert carrier gas, is passed continuously over the material to be dried at a rate which is in the range from 0.001 to 10 mol of water per hour and kilogram of the crystalline layer lattice compound obtained in stage (i).

The present invention further relates to compositions for stabilizing halogenated plastics from thermal degradation or photochemical degradation, which compositions comprise cationic layer compounds which are obtainable by firstly subjecting layer compounds of the general formula (I)

$$[E_eZ_zD_dV_v(OH^-)_x](A^{n-})_a \cdot qH_2O \qquad (I)$$

where:
E is a monovalent cation selected from the group consisting of the alkali metals,
e is a number in the range from 0 to 2,
Z is a divalent metal cation,
z is a number in the range from 0 to 6,
D is a trivalent metal cation,
d is a number in the range from 0 to 3,
V is a tetravalent metal cation,
v is a number in the range from 0 to 1,
($A^{n-}$) is an acid anion of charge n−, where n is an integer from 1 to 3, and
q is a number in the range from 1 to 10,
with the proviso that x>a and e+2z+3d+4v=x+na,
(i) to a crystallization and
(ii) then retreating the resultant material,
which comprises, for the retreatment, carrying out a steam drying at temperatures in the range from 200 to 260° C. and the duration of the retreatment being in the range from 3 to 6 hours, with the proviso that steam, which is applied either directly or in the form of a steam-containing inert carrier gas, is passed continuously over the material to be dried at a rate which is in the range from 0.001 to 10 mol of water per hour and kilogram of the crystalline layer lattice compound obtained in stage (i).

The substances produced according to the invention can be used advantageously as stabilizers for halogenated thermoplastic compositions. Examples of such resins are PVC, polyvinylidene chloride, chlorinated or chloro-sulfonated polyethylene, chlorinated polypropylene or chlorinated ethylene/vinyl acetate copolymers. The cationic layer lattice compounds produced according to the invention are particularly suitable as stabilizers for resins of the PVC type, these being taken to mean firstly vinyl chloride homopolymers, and secondly copolymers of vinyl chloride with other monomers.

The present invention further relates accordingly to the use of cationic layer compounds which are obtainable by firstly subjecting layer compounds of the general formula (I)

　　　　(I)

where:
- E is a monovalent cation selected from the group consisting of the alkali metals,
- e is a number in the range from 0 to 2,
- Z is a divalent metal cation,
- z is a number in the range from 0 to 6,
- D is a trivalent metal cation,
- d is a number in the range from 0 to 3,
- V is a tetravalent metal cation,
- v is a number in the range from 0 to 1,
- ($A^{n-}$) is an acid anion of charge n–, where n is an integer from 1 to 3, and
- q is a number in the range from 1 to 10,
- with the proviso that x>a and e+2z+3d+4v=x+na,
    - (i) to a crystallization and
    - (ii) then retreating the resultant material, which comprises, for the retreatment, carrying out a steam drying at temperatures in the range from 200 to 260° C. and the duration of the retreatment being in the range from 3 to 6 hours, with the proviso that steam, which is applied either directly or in the form of a steam-containing inert carrier gas, is passed continuously over the material to be dried at a rate which is in the range from 0.001 to 10 mol of water per hour and kilogram of the crystalline layer lattice compound obtained in stage (i), for stabilizing halogenated plastics from thermal degradation or photochemical degradation.

Preference is given here to the use of the cationic layer compounds produced according to the invention as co-stabilizers for halogenated plastics stabilized with calcium salts and/or zinc salts of carboxylic acids having from 6 to 22 carbons. In particular, the cationic layer compounds produced according to the invention are used as co-stabilizers in polyvinyl chloride. For this the cationic layer compounds—without taking into account the content of any organic additives present—are added in amounts of from 0.01 to 5, preferably from 0.1 to 3, parts by weight—based on 100 parts by weight of synthetic resins. Generally, they are mechanically mixed with the plastics present in granular form, before the shaping is carried out, for example in the calender and extrusion processes. Generally, the commercial zinc salts and/or calcium salts of carboxylic acids having from 6 to 22 carbons are added as conventional stabilizers simultaneously with the cationic layer compounds. Obviously, other conventional additives, such as the heat stabilizers described in European Application EP-A-189 899, can also be used. The amounts of the stabilizers and co-stabilizers can be varied in any proportion with the proviso that the total stabilizer addition is within the quantitative limit of from 0.5 to 5 parts by weight—based on 100 parts by weight of synthetic resins. The minimum amount of cationic layer compound is therefore at least 0.01% by weight.

The use of the cationic layer compounds of the invention improves the action of zinc soaps and/or calcium soaps in the stabilization of the halogenated plastics. In addition, the cationic layer compounds of the invention can be incorporated outstandingly as co-stabilizers into the halogenated plastics without adversely affecting the rheology of the plastics.

If desired, the cationic layer compounds produced according to the invention can then be modified with at least one liquid or low-melting, dispersing additive selected from compounds of the following listed groups A) to F) by intensive mixing at room temperature (15 to 25° C.) or a temperature below the decomposition temperatures of the cationic layer compounds and/or the additives, preferably below 300° C. The groups A) to F) are:

A) Polyols having from 3 to 30 carbons and at least 2 hydroxyl groups.
B) Esters of partially or completely epoxidized unsaturated carboxylic acids having from 6 to 22 carbons.
C) Complete and partial esters of polyols having from 3 to 30 carbons and from 2 to 12 hydroxyl groups with carboxylic acids having from 6 to 22 carbons.
D) Alkyl phosphites and aryl phosphites.
E) Anions of saturated or unsaturated fatty acids having from 6 to 22 carbons.
F) Polymers soluble in water at pHs above 8 having a molecular weight of from 500 to 50,000.

Suitable additives of group A) are polyols having at least two hydroxyl groups and a total of from 3 to 30 carbons. Examples of such polyols are diols having from 3 to 30 carbons, such as butanediols, hexanediols, dodecanediols and polyols such as trimethylolpropane, pentaerythritol, glycerol and their industrial oligomer mixtures having mean degrees of condensation of from 2 to 10. Very particular preference is given to polyols having from 3 to 30 carbons whose C skeleton bears, at a distance of 3 carbons, at least one hydroxyl group or one ether oxygen, preferably glycerol and/or the industrial oligoglycerol mixtures having mean degrees of condensation of from 2 to 10. In particular, also suitable for this is tris(2-hydroxyethyl)isocyanurate, known as "THEIC" (EP-B-377 428).

The additives of group B) are esters of partially or completely epoxidized unsaturated carboxylic acids having from 6 to 22 carbons. Suitable esters are esters of monohydric, dihydric and/or trihydric alcohols which are completely esterified with epoxidized unsaturated carboxylic acids having from 6 to 22 carbons, such as methyl, 2-ethylhexyl, ethylene glycol, butanediol, neopentyl glycol, glycerol and/or trimethylolpropane esters of epoxidized lauroleic acid, palmitoleic acid, oleic acid, ricinoleic acid, linoleic acid and/or linolenic acid. Preference is given to esters of trihydric alcohols and completely epoxidized unsaturated carboxylic acids having from 12 to 22 carbons, and in particular esters of glycerol with completely epoxidized unsaturated carboxylic acids having from 12 to 22 carbons. The carboxylic acid component can be derived, for example, from palmitoleic acid, oleic acid, elaidic acid, petroselinic acid, ricinoleic acid, linolenic acid, gadoleic acid or erucic acid. The unsaturated carboxylic acids are epoxidized by known methods. As customary in fat chemistry, the glycerides of epoxidized carboxylic acids can also be industrial mixtures as obtained by epoxidation of natural unsaturated fats and oils. Preferably, epoxidized rapeseed oil, epoxidized unsaturated soybean oil and/or epoxidized sunflower seed oil from recent cultivation are used.

The additives of group C) are complete or partial esters which are obtained by the relevant methods of preparative organic chemistry, for example by acid-catalyzed reaction of polyols with carboxylic acids. Suitable polyol components here are those which have already been described in group A). As acid component, preference is given to aliphatic, saturated and/or unsaturated carboxylic acids having from 6 to 22 carbons, such as caproic acid, caprylic acid, capric acid, lauric acid, myristic acid, palmitic acid, palmitoleic acid, stearic acid, oleic acid, ricinoleic acid, linoleic acid, linolenic acid, behenic acid or erucic acid. As customary in fat chemistry, the carboxylic acid component can also be an industrial mixture as produced in the pressure cleavage of natural fats and oils. Preference is given to partial esters of glycerol and in particular of its industrial oligoglycerol mixtures having mean degrees of condensation of from 2 to 10 and saturated and/or unsaturated aliphatic carboxylic acids having from 6 to 22 carbons.

The additives of group D) used can be alkyl phosphites and aryl phosphites, preferably those of the general formula II

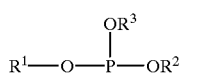

(II)

where $R^1$, $R^2$ and $R^3$ independently of one another are an alkyl radical having from 1 to 18 carbons or a phenyl radical. Typical examples of additives of group D) are tributyl phosphite, triphenyl phosphite, dimethyl phenyl phosphite and/or dimethyl stearyl phosphite. Preference is given to diphenyl decyl phosphite.

Suitable additives of group E) are anions of saturated or monounsaturated or polyunsaturated fatty acids having from 6 to 22 carbons, which can be unbranched or branched. Owing to their readier availability, preference is given to unbranched fatty acids. Pure fatty acids are suitable here, for example lauric acid, myristic acid, palmitic acid, stearic acid, lauroleic acid, myristoleic acid, palmitoleic acid, oleic acid, linoleic acid or linolenic acid. It is also economically attractive to use fatty acid mixtures, as are obtainable from the cleavage of natural oils and fats. It is not important here whether the fatty acids are used as such or as—preferably water-soluble—salts, for example as sodium salts or potassium salts. Since the reaction mixture is strongly alkaline, the reaction product will in any case contain the fatty acids in the form of their anions.

Additives of group F) are polymers which are soluble in water at pHs above 8, preferably at pHs of from 9 to 12, and which have a mean (number average) molecular weight of from 500 to 50,000. The term "soluble" means in this context that the polymeric additives are completely dissolved at more than 0.01% by weight in an aqueous solution of pH 10, established using alkali metal hydroxides at 20° C., preferably at at least 0.1% by weight and in particular under the specified conditions. In principle, as polymeric additives, all polymers can be used which are known to those skilled in the art as pigment dispersers (cf. Kirk-Othmer "Encyclopedia of Chemical Technology", Vol. 7, third edition, 1979, pages 840–841 or Ullmann's "Encyclopedia of Industrial Chemistry", Vol. A8, 5th edition, 1987, pages 586–601), provided that they comply with the preconditions of solubility and molecular weight. Preference is given as polymeric additives to acrylic acid homopolymers and copolymers and methacrylic acid homopolymers and copolymers, ligninsulfonates and trimeric fatty acids. Those which are suitable in particular are polymeric additives selected from the group consisting of polymers of acrylic acid and methacrylic acid and their copolymers with unsaturated monomers containing sulfonic acid groups, unsaturated monomers containing phosphonic acid groups, unsaturated aliphatic carboxylic acids having from 3 to 5 carbons, amides of unsaturated aliphatic carboxylic acids having from 3 to 5 carbons, amino-containing unsaturated monomers and/or their salts, vinyl acetate, vinyl chloride, acrylonitrile, vinylidene chloride, 1,3-butadiene, styrene, alkylstyrenes having from 1 to 4 carbons in the alkyl radical. Examples of these are polyacrylic acid, polymethacrylic acid—hereinafter acrylic acid and methacrylic acid and their derivatives will be abbreviated as (meth)acrylic acid and derivatives for simplicity—and/or their salts such as polysodium(meth)acrylate, copolymers of (meth)acrylic acid with maleic acid, maleic anhydride, styrenesulfonic acid, $\mu$-methylstyrene, 2-vinylpyridine, 1-vinylimidazole, dimethylaminopropyl(meth)acrylamide, 2-(meth)acrylamido-2-methylpropanesulfonic acid, (meth)acrylamide, N-hydroxydimethyl(meth)acrylamide and/or their salts. Very particular preference among the polymeric additives is given to those which have predominantly anionic character, that is to say which bear the majority of acid groups free or in the form of their salts. In particular, preference is given to polymers of (meth)acrylic acid and its copolymers with styrene, alkylstyrenes having from 1 to 4 carbons in the alkyl radical, styrenesulfonic acid, maleic acid and/or salts thereof, in particular sodium salts thereof and maleic anhydride. Expediently, the polymeric additives have a molecular weight of from 1000 to 10,000. The polymeric additives can be produced by known processes such as solvent-free polymerization or solvent polymerization (cf. Ullmann's Encyclopädie der technischen Chemie [Encyclopedia of Industrial Chemistry], Volume 19, 4th edition, pages 2–11, 1980). Methods for producing ligninsulfonic acid and its salts are also described in Ullmann's Encyclopädie der technischen Chemie, Volume 16, 4th edition, pages 254–257, 1978. Trimeric fatty acids are commercial products which are produced as residue in the distillation of dimeric fatty acids, such as Pripol® 1040 from Unichema or Emery® 1000 from Emery.

The term low-melting additives of groups A) to F) is taken to mean additives which can be converted into the liquid state at atmospheric pressure below the abovementioned decomposition temperatures. Instead of the intensive mixing, if desired, the cationic layer compounds obtained after the production can then be ground with one or more additives selected from the groups A) to F) in the presence of polar organic solvents or water, preferably using grinding-medium mills and in particular a ball mill, dried and if appropriate redried. The term polar organic solvents is taken to mean hydrocarbon compounds which are liquid at room temperature (from 15 to 25° C.) which have at least one substituent which is more electronegative than carbon. These include chlorinated hydrocarbons, alcohols, ketones, esters, ethers and/or glycol ethers. Suitable polar organic solvents are methanol, ethanol, n-butanol, acetone, methyl ethyl ketone, methyl isobutyl ketone, cyclohexanol, isophorone, ethyl acetate, ethyl lactate, 2-methoxyethyl acetate, tetrahydrofuran, ethyl glycol monomethyl ether, diethylene glycol monoethyl ether. For this modification with the organic additives to be carried out retrospectively, i.e. after drying the cationic layer compounds produced according to the invention to form a powder, suitable amounts of additive are between about 5 and about 100% by weight, based on the cationic layer compound.

The use of the additives A) to F) in combination with cationic layer compounds is moreover disclosed by the publications WO 92/06135, WO 92/20732 and WO 92/20619.

The cationic layer lattice compounds produced according to the invention can be used as sole stabilizers for halogenated thermoplastic resins. However, preferably, they are used in combination with other stabilizers. In addition to the abovementioned use in combination with metal soaps, here, primarily, 1,3-diketone compounds, organic esters of phosphorous acid, polyols and amino acids are taken into consideration.

Examples of 1,3-diketone compounds are: dibenzoyl methane, stearoylbenzoylmethane, palmitoylbenzoylmethane, myristoylbenzoylmethane, lauroylbenzoylmethane, benzoylacetone, acetylacetone, tribenzoylmethane, diacetylacetobenzene, p-methoxy- and stearoylacetophenone, ethyl acetoacetate.

Examples of suitable esters of phosphorous acid are triaryl phosphites, such as triphenyl phosphite, tris(p-nonylphenyl) phosphite (TNPP); alkyl aryl phosphites such as monoalkyl diphenyl phosphites, for example diphenyl isooctyl phosphite, diphenyl isodecyl phosphite and dialkyl monophenyl phosphites, such as phenyl diisooctyl phosphite, phenyl diisodecyl phosphite and trialkyl phosphites, such as triisooctyl phosphite and tristearyl phosphite.

Examples of suitable polyols are trimethylolpropane, di-(trimethylolpropane), erythritol, pentaerythritol, dipentaerythritol, sorbitol, mannitol.

Examples of amino acid derivatives are glycine, alanine, lysine, tryptophan, acetylmethionine, pyrrolidonecarboxylic acid, beta-aminocrotonic acid, alpha-aminoacrylic acid, alpha-aminoadipic acid and esters derived therefrom. The alcohol components of these esters include monohydric alcohols such as methanol, ethanol, propanol, isopropanol, butanol, 2-ethylhexanol, octanol, isooctanol, lauryl alcohol, stearyl alcohol, and polyols such as ethylene glycol, propylene glycol, 1,3-butanediol, 1,4-butanediol, glycerol, diglycerol, trimethylolpropane, pentaerythritol, dipentaerythritol, sorbitol and mannitol.

Examples of suitable epoxy compounds are epoxidated soybean oil, epoxidated rapeseed oil, epoxidated esters of unsaturated fatty acids such as epoxidated methyl oleate, epoxidated butyl oleate, epoxidated alicyclic substances, glycidyl ethers such as bisphenol-A diglycidyl ether, bisphenol-F diglycidyl ether, in addition glycidyl esters such as glycidyl acrylate and glycidyl methacrylate.

The examples hereinafter serve to illustrate the invention and are not to be understood as restrictive.

EXAMPLES

A) Production

Example 1

In-situ production of the layer compound (I)

60 g of Al(OH)$_3$ moist hydrate (equivalent to 66% of Al$_2$O$_3$) were dissolved in 75 g of a 50% strength by weight aqueous sodium hydroxide solution at a temperature of 80° C. 27.4 g of soda were then added with stirring. To the resultant suspension was added slowly dropwise a solution of 130 g of magnesium chloride in 75 g of deionized water.

Crystallization step (i)

The reaction mixture was heated to 80° C., admixed with 152.6 g of a 50% strength by weight aqueous sodium hydroxide solution and crystallized for eight hours. The resultant product was filtered and washed twice, each time with 500 ml of water. The yield was 60 g of crystalline product.

Retreatment step (ii)

The resultant crystalline product was then subjected to a retreatment. For this purpose, the crystalline product was spread in a ceramic dish (diameter about 15 cm, layer height about 0.5 cm), this ceramic dish was placed in a muffle furnace heated to 240° C. and steam-containing air was continuously passed over the material to be dried for a period of 5 hours. The steam-containing air was produced as follows: at 20° C., room air of a relative humidity of 65% was passed through a wash bottle which contained 1 liter of water at a temperature of 20° C. at a flow rate of 80 l/h (liters per hour). The air stream which was enriched with water vapor in this manner was then continuously passed over the material to be dried in the muffle furnace for a period of 3 hours.

Example 2

Example 1 was repeated, but in the retreatment step (ii), the steam-enriched air stream was passed over the material to be dried in the muffle furnace for a period of 4 hours.

Example 3

Example 1 was repeated, but in the retreatment step (ii), the steam-enriched air stream was passed over the material to be dried in the muffle furnace for a period of 5 hours.

Example 4

Example 1 was repeated, but in the retreatment step (ii), the steam-enriched air stream was passed over the material to be dried in the muffle furnace for a period of 6 hours.

Comparison Example 1

Example 1 was repeated, but in the retreatment step (ii), the steam-enriched air stream was passed over the material to be dried in the muffle furnace for a period of 1 hour.

Comparison Example 2

Example 1 was repeated, but in the retreatment step (ii), the steam-enriched air stream was passed over the material to be dried in the muffle furnace for a period of 8 hours.

B) Performance tests

The substances produced according to the abovementioned examples and comparison examples were examined for their ability to improve the color stability of PVC. For this purpose, use was made of the parameters explained below "initial color" and "long-term stability". The test specimens used were milled sheets from which test strips were stamped out. The milled sheets were produced using the following test formulation as a basis:

| | |
|---|---|
| PVC (Solvic 268; Solvay) | 100.0 parts |
| Calcium stearate | 0.5 part |
| Zinc stearate | 0.5 part |
| Rhodiastab 50 (Rhône-Poulenc) | 0.2 part |
| Test substance[a)] | 1.0 part |

[a)]Test substance = the substances produced according to the abovementioned examples and comparison examples.

The test specimens were produced by homogenizing and plasticizing the hard PVC composition and said additives on a laboratory roll mill for 5 minutes at 170° C. From the roughly 0.5 mm thick milled sheets thus produced, test strips 15 mm wide were cut out.

Immediately after the milled sheets were produced, their color, the so-called initial color, was determined. For this purpose, the L*,a*,b* method (cf. DIN 6174, CIELAB 1976) known to those skilled in the art was used. The b* value indicates the position on the blue/yellow axis. Customarily the b* value is also called yellow value. For the measurements, a commercial instrument called "Micro Color" (Dr. Lange) was used. The initial colors are summarized in Table 1. It was found that the milled sheets having a content of the test substances according to the invention (produced according to Examples 1 to 4) had significantly better initial colors than the milled sheets having a content of the test substances which were not according to the invention (produced according to Comparison Examples 1 and 2).

As a further parameter, the time taken until the test strips became discolored black during a temperature treatment in a thermal furnace was determined (see DIN 5033). For this purpose the test-substance-containing test strips were heated at 180° C. in a thermal furnace, in which case the test strips were removed briefly from the furnace for visual inspection at intervals of 15 minutes. The time in minutes until black discoloration is termed long-term stability. The test results are summarized in Table 1.

TABLE 1

| Test substance according to | Retreatment time in step (ii) | Initial color[b)] | Long-term stability[c)] |
|---|---|---|---|
| Comparison example 1 | 1 hour | 17.1 | 105 |
| Example 1 | 3 hours | 15.6 | 105 |
| Example 2 | 4 hours | 14.8 | 105 |
| Example 3 | 5 hours | 14.6 | 105 |
| Example 4 | 6 hours | 15.3 | 105 |
| Comparison Example 2 | 8 hours | 17.8 | 60 |

[b)]Initial color = yellow value b*
[c)]Long-term stability = minutes until black discoloration

What is claimed is:

1. A method of preparing a modified cationic layer compound, said method comprising:

(a) providing a layer compound of the general formula (I):

[E_eZ_zD_dV_v(OH^-)_x](A^{n-})_a·qH_2O    (I)

wherein E represents one or more monovalent alkali metal cations, e represents a number of from 0 to about 2, Z represents one or more divalent metal cations, z represents a number of from 0 to about 6, D represents one or more trivalent metal cations, d represents a number of from 0 to about 3, V represents one or more tetravalent metal cations, v represents a number of from 0 to about 1, (A^{n-}) represents an acid anion wherein n represents an integer of from 1 to 3, q represents a number of from about 1 to about 10, and wherein x>a and e+2z+3d+4v=x+na;

(b) subjecting the layer compound to crystallization to provide a resultant material; and (c) subjecting the resultant material to steam drying at a temperature of from about 200° C. to about 260° C. for a period of time of from about 3 to about 6 hours, said steam drying comprising passing a source of steam continuously over the resultant material at a rate of from about 0.001 to about 10 moles of water per hour, per kilogram of the resultant material.

2. The method according to claim 1, wherein the source of steam is passed continuously over the resultant material at a rate of from about 0.1 to about 5 moles of water per hour, per kilogram of the resultant material.

3. The method according to claim 1, wherein said steam drying comprises passing a steam-containing inert carrier gas continuously over the resultant material at a rate of from about 500 to about 1500 liters, at 20° C. and 1 bar, per hour, per kilogram of the resultant material; and wherein steam is present in the steam-containing inert carrier gas at a rate of from about 0.5 to about 1.5 moles of water per hour, per kilogram of the resultant material.

4. The method according to claim 1, wherein the crystallization comprises alkali-induced aging in an aqueous medium containing an alkali metal hydroxide at a temperature of from about 60° C. to about 100° C. for a time period of from about 2.5 hours to about 50 hours, and wherein the alkali metal hydroxide is present in a concentration of from about 1 molar to about 6 molar.

5. The method according to claim 2, wherein the crystallization comprises alkali-induced aging in an aqueous medium containing an alkali metal hydroxide at a temperature of from about 60° C. to about 100° C. for a time period of from about 2.5 hours to about 50 hours, and wherein the alkali metal hydroxide is present in a concentration of from about 1 molar to about 6 molar.

6. The method according to claim 3, wherein the crystallization comprises alkali-induced aging in an aqueous medium containing an alkali metal hydroxide at a temperature of from about 60° C. to about 100° C. for a time period of from about 2.5 hours to about 50 hours, and wherein the alkali metal hydroxide is present in a concentration of from about 1 molar to about 6 molar.

7. The method according to claim 1, wherein v equals zero.

8. The method according to claim 4, wherein V equals zero.

9. The method according to claim 1, wherein e equals zero.

10. The method according to claim 4, wherein e equals zero.

11. The method according to claim 1, wherein v and e both equal zero.

12. The method according to claim 4, wherein v and e both equal zero.

13. The method according to claim 11, wherein D represents an aluminum cation, d equals 1, and x represents a number of from about 1 to about 5.

14. The method according to claim 12, wherein D represents an aluminum cation, d equals 1, and x represents a number of from about 1 to about 5.

15. A modified cationic layer compound prepared by the method according to claim 1.

16. A modified cationic layer compound prepared by the method according to claim 14.

17. A stabilizer composition for halogen-containing plastics, said composition comprising a modified cationic layer compound prepared by providing a layer compound of the general formula (I):

[E_eZ_zD_dV_v(OH^-)_x](A^{n-})_a·qH_2O    (I)

wherein E represents one or more monovalent alkali metal cations, e represents a number of from 0 to about 2, Z represents one or more divalent metal cations, z represents a number of from 0 to about 6, D represents one or more trivalent metal cations, d represents a number of from 0 to about 3, V represents one or more tetravalent metal cations, v represents a number of from 0 to about 1, (A^{n-}) represents an acid anion wherein n represents an integer of from 1 to 3, q represents a number of from about 1 to about 10, and wherein x>a and e+2z+3d+4v=x+na; subjecting the layer compound to crystallization to provide a resultant material; and subjecting the resultant material to steam drying at a temperature of from about 200° C. to about 260° C. for a period of time of from about 3 to about 6 hours, said steam drying comprising passing a source of steam continuously over the resultant material at a rate of from about 0.001 to about 10 moles of water per hour, per kilogram of the resultant material.

18. The stabilizer composition according to claim 17, wherein v and e both equal zero, D represents an aluminum cation, d equals 1, and x represents a number of from about 1 to about 5; wherein the crystallization comprises alkali-induced aging in an aqueous medium containing an alkali metal hydroxide at a temperature of from about 60° C. to about 100° C. for a time period of from about 2.5 hours to about 50 hours, and the alkali metal hydroxide is present in a concentration of from about 1 molar to about 6 molar; and wherein the source of steam is passed continuously over the resultant material at a rate of from about 0.1 to about 5 moles of water per hour, per kilogram of the resultant material.

19. A method of stabilizing a halogen-containing plastic, said method comprising:

(a) providing a halogen-containing plastic composition;

(b) providing a modified cationic layer compound; and (c) combining the halogen-containing plastic composition and the modified cationic layer compound;

wherein the modified cationic layer compound is prepared by providing a layer compound of the general formula (I):

$$[E_e Z_z D_d V_v (OH^-)_x](A^{n-})_a \cdot qH_2O \quad (I)$$

wherein E represents one or more monovalent alkali metal cations, e represents a number of from 0 to about 2, Z represents one or more divalent metal cations, z represents a number of from 0 to about 6, D represents one or more trivalent metal cations, d represents a number of from 0 to about 3, V represents one or more tetravalent metal cations, v represents a number of from 0 to about 1, $(A^{n-})$ represents an acid anion wherein n represents an integer of from 1 to 3, q represents a number of from about 1 to about 10, and wherein x>a and e+2z+3d+4v=x+na; subjecting the layer compound to crystallization to provide a resultant material; and subjecting the resultant material to steam drying at a temperature of from about 200° C. to about 260° C. for a period of time of from about 3 to about 6 hours, said steam drying comprising passing a source of steam continuously over the resultant material at a rate of from about 0.001 to about 10 moles of water per hour, per kilogram of the resultant material.

20. The method according to claim 19, wherein v and e both equal zero, D represents an aluminum cation, d equals 1, and x represents a number of from about 1 to about 5; wherein the crystallization comprises alkali-induced aging in an aqueous medium containing an alkali metal hydroxide at a temperature of from about 60° C. to about 100° C. for a time period of from about 2.5 hours to about 50 hours, and the alkali metal hydroxide is present in a concentration of from about 1 molar to about 6 molar; and wherein the source of steam is passed continuously over the resultant material at a rate of from about 0.1 to about 5 moles of water per hour, per kilogram of the resultant material.

* * * * *